No. 748,343. Patented December 29, 1903.

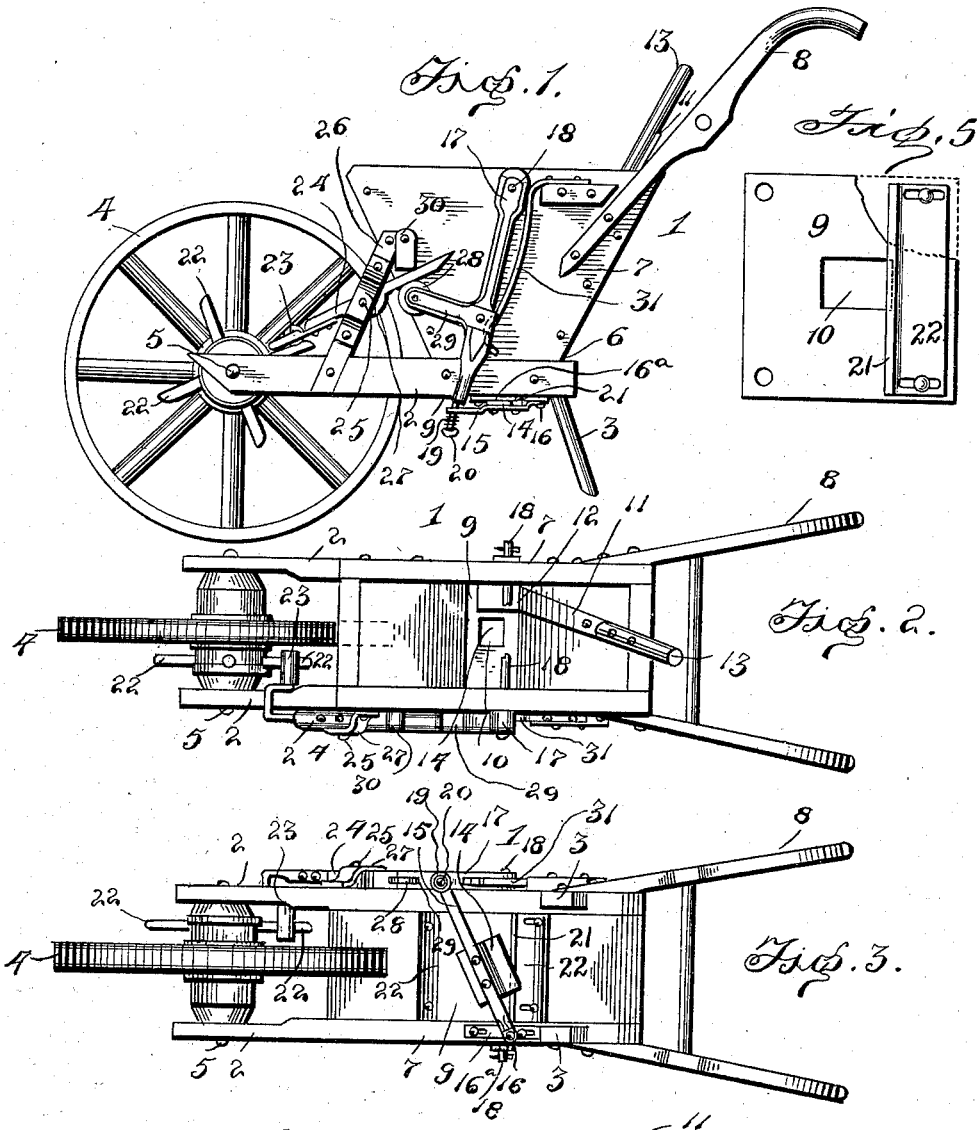

UNITED STATES PATENT OFFICE.

JEFFERSON BOYD AND JOHN DIBPSON BOYD, OF ENON, MISSISSIPPI, ASSIGNORS OF ONE-THIRD TO JOHN F. MULFORD, OF BISMARCK, MISSISSIPPI.

FERTILIZER-DISTRIBUTER.

SPECIFICATION forming part of Letters Patent No. 748,343, dated December 29, 1903.

Application filed August 24, 1903. Serial No. 170,574. (No model.)

*To all whom it may concern:*

Be it known that we, JEFFERSON BOYD and JOHN DIBPSON BOYD, citizens of the United States, residing at Enon, in the county of Pike and State of Mississippi, have invented certain new and useful Improvements in Fertilizer-Distributers; and we do declare the following to be a full, clear, and exact description of the invention, such as will enable others skilled in the art to which it appertains to make and use the same.

This invention relates to certain new and useful improvements in fertilizer distributers or droppers.

The object of the invention is to provide a device of this character which will be simple in construction, durable in use, efficient in operation, and comparatively inexpensive to manufacture.

With this and other objects in view the invention consists of certain novel features of construction, combination, and arrangement of parts, as will be more fully described, and particularly pointed out in the appended claims.

In the accompanying drawings, Figure 1 is a side elevation of our improved fertilizer-distributer. Fig. 2 is a top plan view of the same. Fig. 3 is a bottom plan view. Fig. 4 is a detail vertical longitudinal sectional view through the hopper. Fig. 5 is a bottom plan view showing the rib 21 on the plate 22 and also illustrating the manner of adjustment of said plate.

Referring to the drawings by numerals, 1 denotes a hopper or fertilizer-receptacle mounted upon side beams 2, which are supported at their rear ends by short legs 3 and at their front ends by a wheel 4, the shaft 5 of which is journaled in the front ends of said side beams. The said hopper 1 has its ends 6 inclined and secured at their lower extremities between the side beams 2, and to the sides 7 of said hopper are secured rearwardly-projecting handles 8, by means of which the rear portion of the device may be raised when the same is pushed along upon the wheel 4. The bottom 9 of the hopper is provided with an opening 10, through which the fertilizer contained in the hopper drops as the machine moves forwardly. In order to regulate the size of said opening, and hence the feed of the fertilizer, a lever 11 is pivoted to the inner side of the rear end of the hopper and is formed at its lower end with a bent portion 12, adapted to move across said opening 10 when the upper end of the lever, which is provided with a handle 13, is operated.

In order to drop the fertilizer intermittently, said feed-opening 10 is adapted to be opened and closed by a valve-plate 14, secured upon a lever 15, which has one of its ends pivoted at 16 upon a plate 16ª, which is adjustably secured to the under side of one of the side beams 2, as shown. The other end of said lever is pivotally connected to the lower end of an oscillating or swinging arm 17, which is pivotally mounted at its upper end by means of a cross-shaft 18, projecting through the sides of the hopper. The valve-lever 15 has a yielding pivotal connection with the lower end of said arm 17 by providing a coil-spring 19 upon the pivot-pin 20, between its head and said lever, in order to hold said valve-plate close against the opening and in contact with a scraper-rib 21, which may be formed integral with the bottom 9 of the hopper or on a separate plate 22, which is secured upon the under side of the bottom 9. Said plate 22 may be made adjustable, as shown, to vary the size of the opening. Said rib is disposed transversely across the under side of the bottom 9 in rear of the opening 10 and is adapted to scrape the fertilizer from the valve-plate as the same is reciprocated across the opening. It will be seen that the adjustable pivot-plate 16ª permits the valve-plate to be adjusted so as to cover said opening or to uncover the same to the desired extent, and the spring 19 will take up the wear of the various parts and always hold the valve-plate against the scraper 21. It will also be seen that the use of the rib 21 allows the bottom 9, on which it is formed, to be made of metal and to also form a wear-plate to sustain the wear from the movement of the valve-plate. Further, the construction of the scraper in the form of a rib provides for its ready sharpening at intervals to present a proper edge to cleanly scrape the valve-plate.

The arm 17 is adapted to be rocked or oscillated as the device is moved forwardly by providing the hub of the wheel 4 with tappet pins or lugs 22, which as the wheel revolves engage a friction-roller 23 upon one end of a lever 24, which is pivoted on a pin 25, secured between a diagonal brace 26 and a bracket 27, attached to the same. The opposite end of the said lever 24 is adapted to engage a friction-roller 28, journaled upon a projection 29 upon the arm 17. A stop 30, secured upon one side of the hopper, limits the movement of said lever 24, and a flat or bow spring 31, having one end secured to the hopper and its other end seated in a groove in the arm 17, is adapted to hold the arm 17 in its forward position, so that the opening 10 will be closed by the valve-plate 14.

In the operation of the device the lever 11 is adjusted to uncover the opening 10 to the desired extent. The handles are then grasped to raise the legs 3 from the ground, and the device is then pushed forwardly, the same being borne upon the wheel 4. As the wheel 4 revolves the tappet-pins 22 will successively engage the roller 23 upon the forward end of the lever 24 and elevate the front end of the same until they pass under said roller. The downward movement of the rear end of the lever 24 forces the arm 17 rearwardly, the roller 28 riding on the under side of said lever 24 as it is depressed. The movement of the arm 17 will oscillate the valve-lever 15 to move the valve-plate 14 from under the opening 10 and uncover the same. As soon as the roller 23 rides over one of the pins 22 the spring 31 will return the lever and cause the various parts to assume their normal position, as shown in Fig. 1.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described our invention, what we claim, and desire to secure by Letters Patent, is—

1. A fertilizer-distributer, comprising side beams, a wheel journaled between the forward ends of the same, legs supporting the rear ends of said side beams, a hopper mounted upon the rear portion of said side beams and provided with a feed-opening in its bottom, a pivoted lever within said hopper for regulating the size of said feed-opening, a valve-lever pivotally mounted beneath the bottom of said hopper and provided with a valve-plate adapted to cover and uncover said feed-opening, a pivoted spring-actuated arm for operating said valve-lever, tappet-pins upon said wheel, and a pivoted tappet-lever adapted to be actuated by said tappet-pins and to actuate said pivoted arm, substantially as described.

2. In a fertilizer-distributer, the combination with a hopper having a feed-opening and a scraper adjacent to said feed-opening, of a valve-lever having a valve adapted to open and close said feed-opening and to engage said scraper, and means for actuating said valve-lever, substantially as described.

3. In a fertilizer-distributer, the combination with a hopper having a feed-opening and a scraper adjacent to said feed-opening, of a pivotally-mounted valve-lever having a feed-plate adapted to be oscillated across said feed-opening and said scraper, a swinging arm for actuating said valve-lever, a yielding connection between said arm and said valve-lever adapted to hold said valve-plate upon said scraper, and means for actuating said arm, substantially as described.

4. In a fertilizer-distributer, the combination with a hopper having a feed-opening and a scraper-rib adjacent to said feed-opening, of an adjustably-mounted pivoted valve-lever having a valve-plate adapted to be oscillated across said feed-opening and said scraper-rib, a pivoted swinging arm having a pivotal connection with said lever, a spring upon said arm engaging said lever and adapted to hold the valve-plate in engagement with said scraper-rib, and means for actuating said arm, substantially as described.

5. In a fertilizer-distributer, the combination with a hopper having a valve-opening and a scraper-rib adjacent to said valve-opening, of an oscillating valve adapted to be moved across said valve-opening and said scraper-rib, substantially as described.

In testimony whereof we have hereunto set our hands in presence of two subscribing witnesses.

JEFFERSON BOYD.
JOHN DIBPSON BOYD.

Witnesses:
J. M. ZACHARY,
W. W. LEGGETT.